Oct. 20, 1936.  T. G. JUNGERSEN  2,057,833
DUMPING BODY FOR AUTOMOBILE TRUCKS
Filed March 6, 1930  6 Sheets-Sheet 2
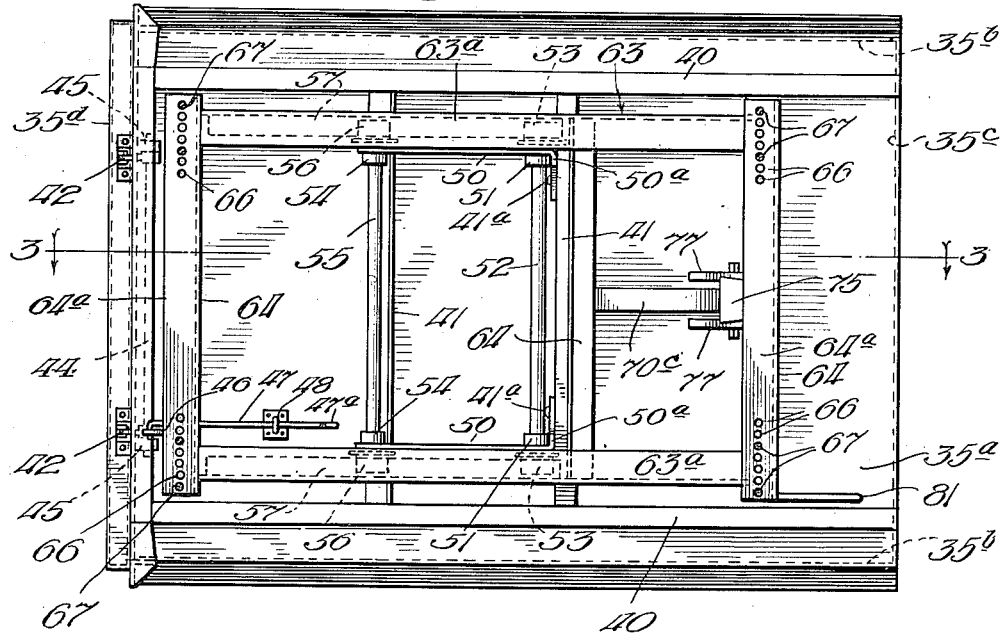
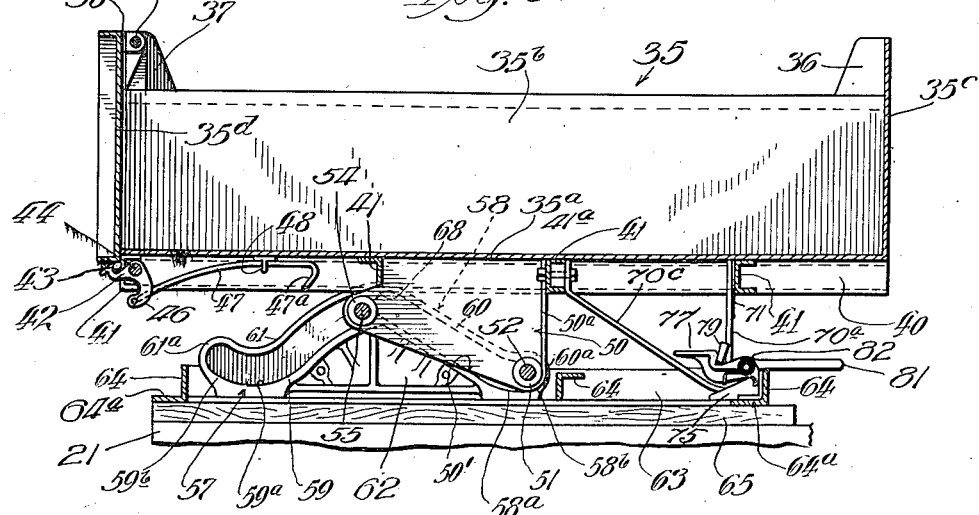

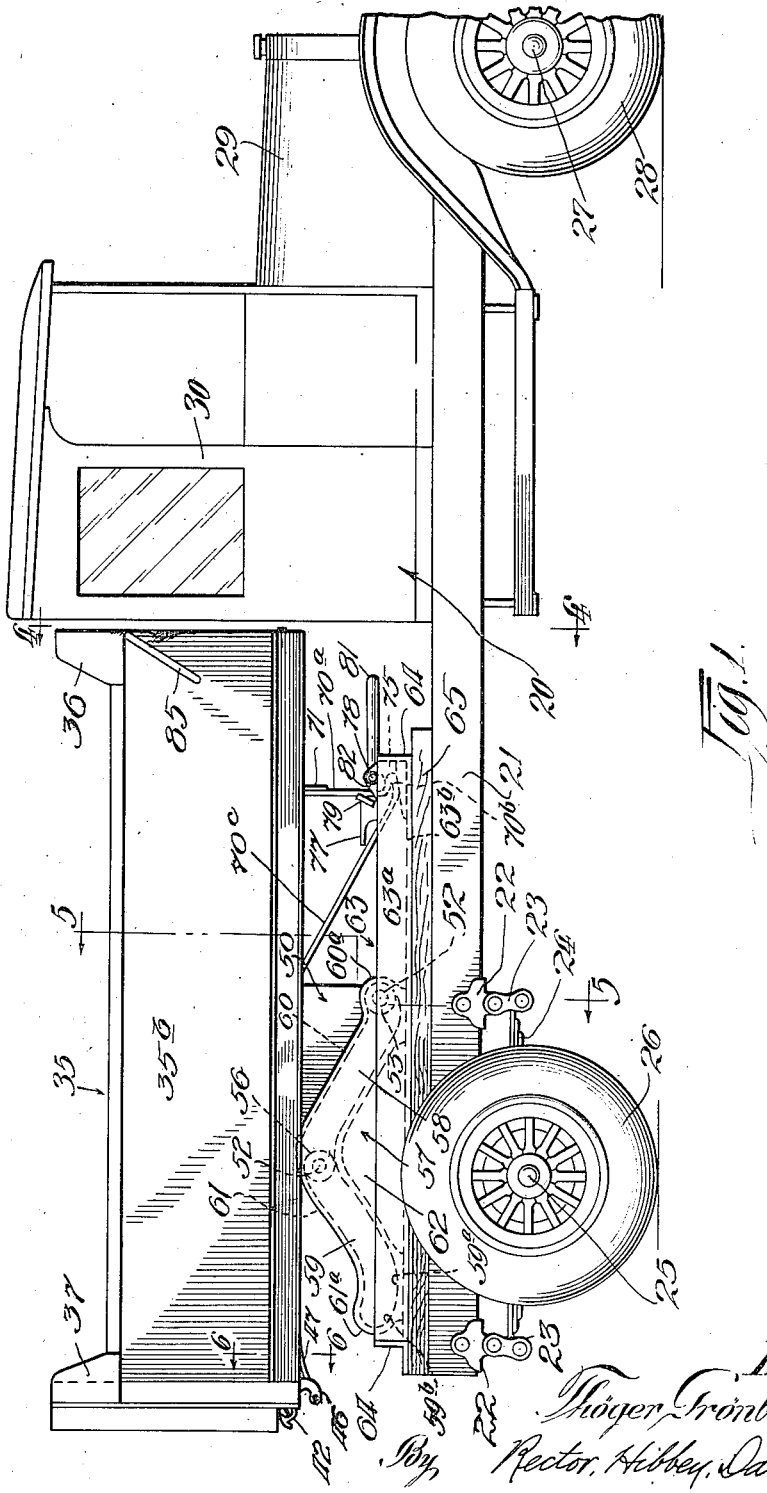

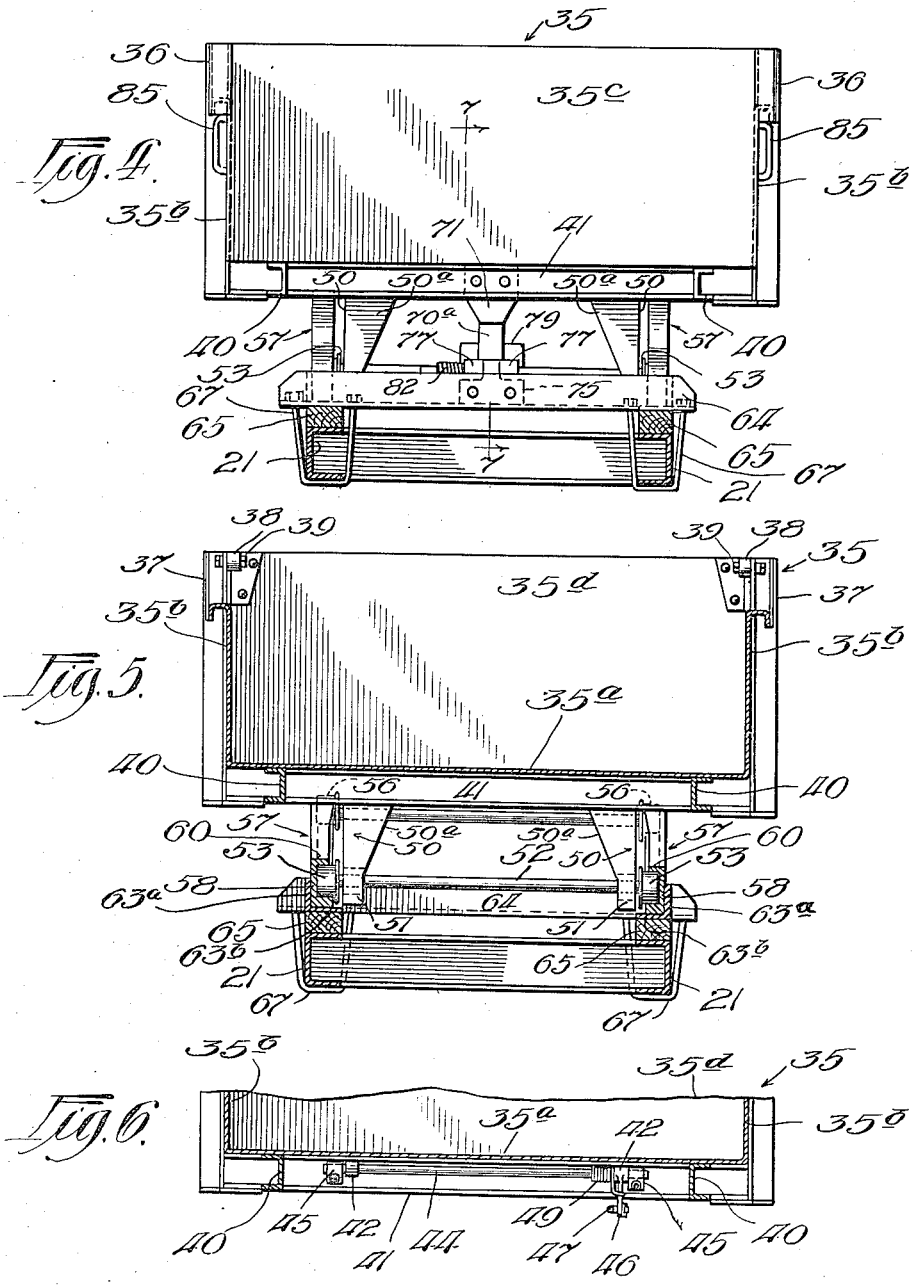

Oct. 20, 1936. T. G. JUNGERSEN 2,057,833
DUMPING BODY FOR AUTOMOBILE TRUCKS
Filed March 6, 1930 6 Sheets-Sheet 4
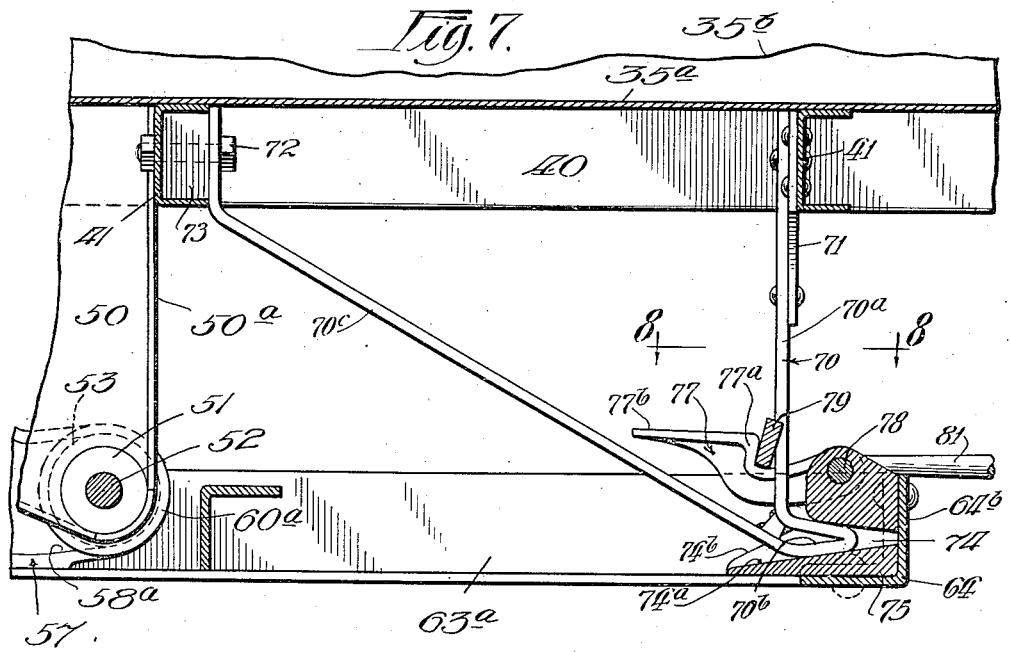
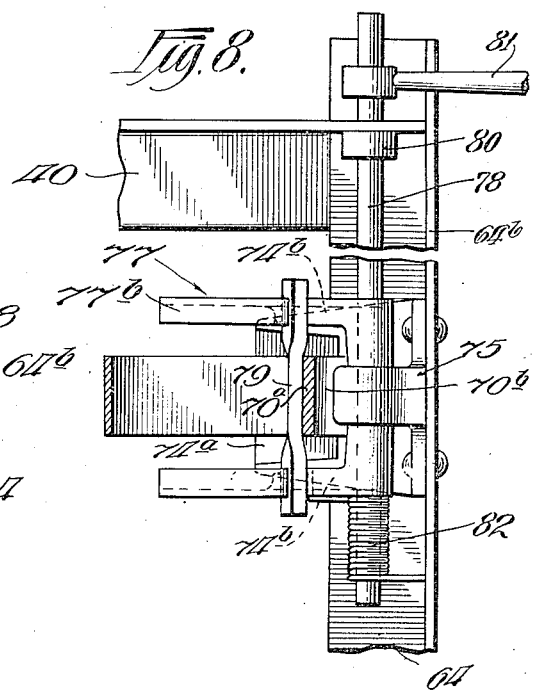
Inventor:
Thöger Grönborg Jungersen
By Rector, Hibbey, Davis & Macauley
Attorneys

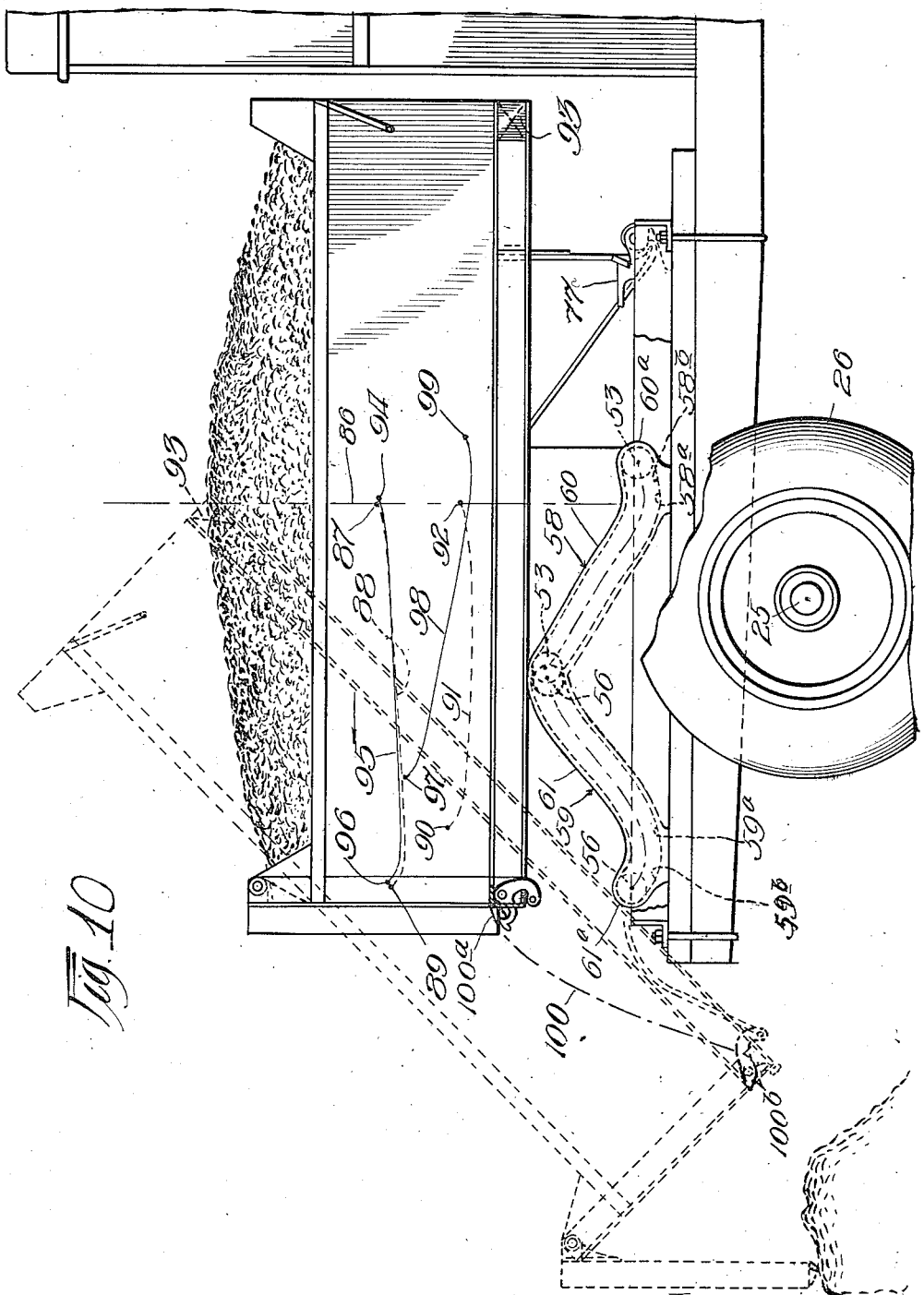

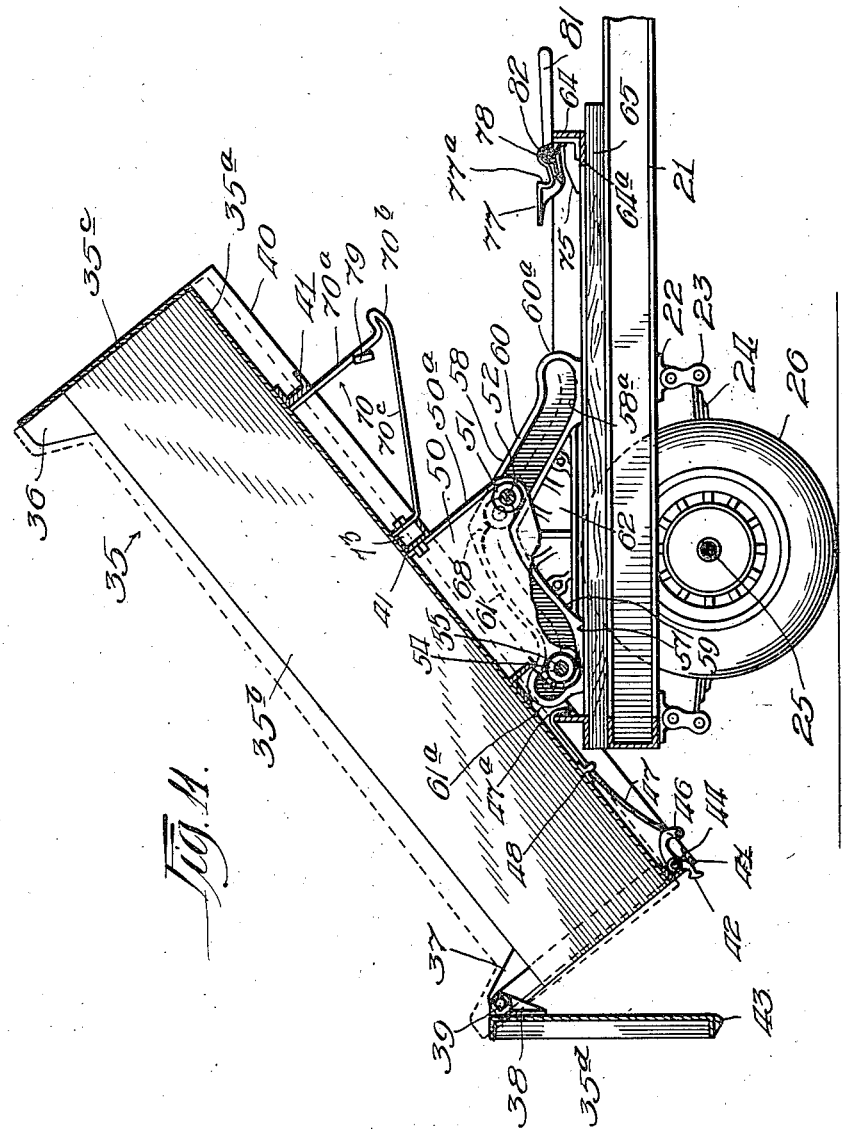

Patented Oct. 20, 1936

2,057,833

UNITED STATES PATENT OFFICE 2,057,833

DUMPING BODY FOR AUTOMOBILE TRUCKS

Thoger Gronborg Jungersen, West Allis, Wis.

Application March 6, 1930, Serial No. 433,639

20 Claims. (Cl. 298—19)

This invention relates to improvements in dumping bodies for automobile trucks and its purpose is to provide an improved body of strong and relatively simple construction which may be readily operated for moving it to and from an inclined dumping position. The principal object of the invention is to provide a body supported by rollers on inclined trackways and arranged so that it may move automatically to and from a dumping position by gravity, or with a slight effort on the part of the attendant, without the necessity of employing any operating mechanism for effecting such movements. A further object of the invention is to provide improved supporting means for the dumping body of an automobile truck which is so arranged that the movement of the center of gravity of the body and its load is such as to cause the body to travel automatically from its normal horizontal position to an inclined dumping position, while the elevation of the body due to the dumping of the load and the elevation of the truck springs is adapted to return the empty body automatically to its normal horizontal position after its contents have been dumped. Another important object of the invention is to provide a dumping body having two or more pairs of supporting rollers, each pair being adapted to travel on upwardly converging inclined trackways, in combination with means for supporting and securing another portion of the body so that the body is normally retained in a horizontal position wherein the body is supported largely by said last named support and by certain of said rollers which are displaced from said last mentioned supporting means beyond the center of gravity of the body. A further object of the invention is to provide a movable dumping body which is substantially in a state of balance in all of its positions with a normal tendency to move toward a dumping position when loaded and to return to its normal horizontal position when unloaded. Still another object is to provide improved means for latching the body in its normal horizontal position and for automatically unlatching a hinged door thereof when the body reaches an inclined dumping position. Other objects of the invention relate to various features of construction and arrangement which will appear more fully hereinafter.

The nature of the invention will be understood from the following specification taken with the accompanying drawings in which certain embodiments are illustrated. In the drawings, Fig. 1 shows a side elevation of one form of truck and dumping body in which the improvements of the present invention are embodied;

Fig. 2 shows a bottom plan view of the removable body and under frame structure shown mounted on the truck frame in Fig. 1;

Fig. 3 is a longitudinal section taken on the line 3—3 of Fig. 2 showing the truck body in upright horizontal position;

Fig. 4 is a transverse section taken on the line 4—4 of Fig. 1;

Fig. 5 is a transverse section taken on the line 5—5 of Fig. 1;

Fig. 6 is a vertical section taken on the line 6—6 of Fig. 1;

Fig. 7 is a section taken longitudinally of the body on the line 7—7 of Fig. 4, showing the means for supporting and latching the forward portion of the body in its normal horizontal position;

Fig. 8 is a horizontal section taken on the line 8—8 of Fig. 7;

Fig. 9 is an end elevation of a portion of the supporting device illustrated in Fig. 8, looking toward the right as viewed in Fig. 8;

Fig. 10 is a partial side elevation, similar to that of Fig. 1, showing somewhat diagrammatically, by full lines, the normal horizontal position of the body when loaded and, by dotted lines, the position of the body when it has reached its extreme inclined dumping position with the rear gate or door thereof open, and indicating the paths of travel of the center of gravity of the body when loaded and unloaded during the tilting movement; and Fig. 11 is a longitudinal sectional view similar to that of Fig. 3, showing the body in an inclined dumping position before the rollers have reached their extreme rear positions on their supporting tracks, the extreme dumping position being shown by dotted lines.

As illustrated in Figs. 1 to 11, inclusive, the invention is shown applied to an automobile truck 20 comprising longitudinal side frame members 21 of the usual channel form which are connected through brackets 22 and links or shackles 23 with body springs 24 having their intermediate points mounted on the rear axle 25. The rear axle is supported by the truck wheels 26 and the forward end of the frame is supported by the front axle 27 which is in turn supported by the front wheels 28. On the forward part of the truck frame there is located the engine 29 by which the truck is propelled and rearwardly of the engine a driver's cab 30 is mounted on the frame, thus leaving a considerable space between the cab and the rear end of the frame members 21 upon which the truck body is adapted to be mounted.

The truck body 35 is a box-like vessel open on its upper side and comprising a bottom wall 35ª, side walls 35ᵇ, a front wall 35ᶜ, and a rear wall or door 35ᵈ. The bottom wall 35ª and the side and end walls 35ᵇ and 35ᶜ, respectively, are preferably formed from a single sheet of metal which is cut to permit the side walls and end wall to be bent upwardly, the end wall 35ᶜ extending above the side walls and being secured thereto by the corner plates 36. At the rear ends of the side walls 35ᵇ, other corner plates or posts 37 are provided and these extend above the side walls and form supports for the hinged brackets 38 which are pivoted thereon at 39 so that the rear wall or door 35ᵈ may swing outwardly and rearwardly from the bottom wall 35ª. The body 35 is provided with an under frame made up of a pair of longitudinal channel-shaped frame members 40 connected by a plurality of transverse channel-shaped frame members 41. These frame members are secured to each other and have their upper horizontal flanges secured to the bottom wall 35ª of the body. A pair of latch members 42 are pivoted on the rear under side of the transverse frame member 41 and are adapted to hook over a plate 43 secured to the lower outwardly extending flange of the door 35ᵈ. These latch members extend through openings in the frame member 41 and are secured on a transverse shaft 44 which is journaled in brackets 45 secured to the adjacent frame member 41. A crank arm 46 is secured to the shaft 44 and extends downwardly therefrom with its lower end pivotally connected to a link 47 of resilient material which inclines upwardly and forwardly to slide in a guide 48 secured to the under side of the body, the forward portion of this link being bent downwardly as shown at 47ª. A coil spring 49 is secured on the shaft 44 with one end bearing against the crank 46 and the other end bearing against the adjacent frame member 41 so that this spring normally holds the latch members 42 in a position wherein they retain the door 35ᵈ in its closed position.

The under frame of the body has secured thereto a pair of supporting plates 50 which extend in parallel vertical planes longitudinally of the truck with their forward portions bent transversely as shown at 50ª and secured to one of the transverse frame members 41 as shown at 41ª. These supporting plates 50 are secured to the under side of the body 35 and at their rear ends are secured to another transverse frame member 41 so that they are rigidly united to the body between two of the transverse sub-frame members 41 and between the parallel longitudinal sub-frame members 40. The supporting plates 50 extend some distance below the under frame of the body, and their lower forward portions are provided with bearings 51 in which there is journaled a transverse shaft 52 having secured on the opposite ends thereof the flanged wheels 53. The plates 50 have their lower edges 50' inclined upwardly and rearwardly from the shaft 52 and the rearwardly extending portions 50ᵇ thereof are provided with bearings 54 in which is journaled a transverse shaft 55 having secured on the opposite ends thereof another pair of flanged wheels 56. The two pairs of wheels or rollers 53 and 56 are adapted to travel in guides or trackways indicated generally at 57, there being two of these guides or trackways extending parallel to each other longitudinally of the truck on the outer sides of the supporting plates 50 so that each guide 57 is engaged by one roller 53 and one roller 56. Each guide or trackway 57 comprises a forward track member 58, on which one of the rollers 53 is adapted to travel, and a rear portion 59 upon which one of the rollers 56 is adapted to travel. The tracks 58 are inclined upwardly and rearwardly from their forward end and unite with the upper portions of the tracks 59 which are inclined downwardly and rearwardly therefrom. These upwardly converging track members 58 and 59 are opposed by complementary guide flanges 60 and 61, respectively, which extend parallel to the flanges which form the tracks 58 and 59. These tracks and flanges extend laterally from upwardly extending plates 62 forming part of the guide members. These guide members rest on the inwardly extending horizontal flanges 63ᵇ of longitudinal frame members 63ª which form a part of an auxiliary frame 63. The side frame members 63ª of this auxiliary frame are connected by transverse frame members 64, also of angle cross-section, and these various frame members are secured together to form a rigid auxiliary frame having attached thereto the guides or track frames 57. A pair of wooden cleats or filler plates 65 are mounted on the longitudinal side frame members 21 of the truck and the sub-frame 63 is mounted on top of these wooden fillers 65 after which the sub-frame 63 is secured rigidly to the truck frame by means of bolts or the like passing through the horizontal flanges 64ª of the front and rear transverse auxiliary frame members 64. A plurality of holes 66 are provided in these flanges 64ª so that the bolts 67 may be passed therethrough in any desired locations to permit the auxiliary frame 63 to be secured to the truck frame members 21 having various spaced relations.

The forward track members 58 have a lesser inclination at their lower forward ends as shown at 58ª where they assume a naturally horizontal position and thence are inclined upwardly and forwardly as shown at 58ᵇ so that the forward rollers 53 are caused to move upwardly to a slight extent as they reach the forward limits of their travel. The upper flange 60 which is opposed to the track 58 has a curvature similar to that of the track 58 and is provided with a curved part 60ª adapted to extend around the roller 53, when the roller is in its forward position, thus restraining the roller from further forward movement. Each of the rear track members 59 also has a lesser inclination toward its lower end as shown at 59ª, from which point it is inclined upwardly and rearwardly as shown at 59ᵇ where it unites with the curved flange 61ª which forms the rear extremity of the flange 61 and which is adapted to extend around one of the rollers 56 when that roller is in its extreme rear position. The guide flanges 60 and 61 are so spaced from the track members 58 and 59, respectively, that they permit the rollers 53 and 56, respectively, to travel freely on these track members while preventing any material upward movement of the rollers away from these track members, so that the body is retained at all times in a firm relation to the auxiliary frame 63 upon which the guide members 57 are secured. When the body 35 is in its normal horizontal position, as shown in Fig. 3, the rollers 53 are in engagement with the forward upwardly inclined portions 58ᵇ of the tracks 58 and the rollers 56 rest on the tracks 59 near the upper extremities thereof but slightly below the points where the tracks 59 unite with the tracks 58. A lug 68 may be provided at the point where each guide flange 60 unites with the adjacent rear guide flange 61. This lug extends partially around one of the rollers 56 when it is in its upper forward position and engages one of the rollers 53 when it is in its upper rear position.

The body 35 is supported at its forward end in its normal horizontal position by means of a standard 70 having the form shown particularly in Figs. 3, 7, 8 and 9. This standard is in the form of a bar which is bent to form a vertically extending arm 70ª united at its lower end with a forwardly extending foot 70ᵇ from which there extends an upwardly and rearwardly extending arm 70ᶜ. The arm 70ᵃ is secured to a reinforcing gusset plate 71 and this plate and the arm are both secured to one of the transverse frame members 41 constituting a part of the body under frame. The arm 70ᶜ is secured by bolts 72 to the transverse frame member 41 to which the forward parts of the supporting plates 50 are attached, a filler block 73 being inserted between the extremity of the arm 70ᶜ and the channel of the member 41 to which it is secured. When the body 30 is in its normal horizontal position the foot 70ᵇ of the supporting standard engages a recess 74 formed in a supporting block 75 which is secured within the angle of one of the transverse auxiliary frame members 64. The lower face of the recess 74 inclines upwardly and forwardly at its rear end as shown at 74ᵃ and the sides of this inclined portion are bounded by flanges 74ᵇ so that as the body reaches its extreme forward position the foot 70ᵇ slides upwardly and forwardly into the recess 74 between the guide flanges 74ᵇ and then rests on the lower wall of the recess to form a support for the forward portion of the body. When the standard 70 is in this position it is normally restrained from rearward movement by means of a pair of latch members 77 which are secured on a shaft 78 journaled in the upper part of the block 75 and which are provided with hooks 77ᵃ adapted to engage the rear side of a plate 79 attached to the arm 70ᵃ of the standard and extending laterally therefrom in both directions. This plate 79 is inclined to a vertical plane so that when the hooks 77ᵃ are in engagement with the rear side thereof, the standard 70 is prevented from moving upwardly or rearwardly, although the inclination is such that the latch members may be released when desired. The shaft 78 extends laterally to one side of the truck, being journaled in bearings 80 carried by the longitudinal frame members 62 and the outer end thereof has a lever 81 secured thereon so that the operator may turn the shaft 78 to operate the latch members 77. The end of the shaft 78 opposite the lever 81 has a coil spring 82 mounted thereon. One end of this coil spring underlies one of the latch members 77 and the other end thereof engages the frame member 64 so that the spring normally tends to move the latch members 77 upwardly to maintain them in engagement with the plate 79. The extent of this upward movement is limited by the engagement of the handle 81 with the upwardly extending flange 64ᵇ of the adjacent auxiliary frame member and thus the upper flat faces 77ᵇ of the latch members are maintained in a position wherein they are engaged by the plate 79 as the body 35 approaches its forward position. The latch members are thus automatically depressed by the plate 79 and then rise up behind the plate as the standard 70 reaches the limit of its forward movement.

When the operator of the truck wishes to dump the contents of the body 35, the lever 81 is elevated to move the latch members 77 downwardly out of engagement with the plate 79, whereupon the body is free to move rearwardly from the position shown in Fig. 3 to an inclined dumping position shown by dotted lines in Fig. 10, where the body occupies a position at the limit of its dumping movement. During this dumping movement of the body 35, the rollers 53 travel upwardly and rearwardly along the inclined tracks 58 while the rollers 56 travel downwardly and rearwardly along the inclined tracks 59. Before the body reaches its extreme rear position, the hooked extremity 47ᵃ of the link 47 engages the rear transverse sub-frame member 64 with the result that the latch members 42 are moved out of engagement with the plate 43, thus allowing the door 35ᵈ to swing outwardly and rearwardly so that the contents of the body are permitted to slide outwardly beneath the door. After the body 35 reaches an inclined position near the limit of its dumping movement, the rear rollers 56 are caused to travel upwardly along the inclined parts 59ᵇ of the tracks 59 and the rollers 53 are then continuing their upward movement along the tracks 58 so that there is an upward throw or movement of the body at the extreme end of its travel which automatically arrests its tilting movement without shock or strain to the body or supporting frame structure. This upward movement at the end of the dumping position, being similar to the upward throw of a shovel in the hands of a workman when throwing materials therefrom, facilitates the discharge of the loose materials from the body over the inclined floor 35ᵃ thereof. When the body is again returned to the normal horizontal position, the rear rollers 56 move downwardly over the inclined track portions 59ᵇ at the same time that the rollers 53 begin their downward movement on the inclined tracks 58, thus facilitating the return of the body to its normal horizontal position. Throughout this return movement the rollers 56 travel on the tracks 59 and the rollers 53 travel on the tracks 58 until the forward rollers 53 reach the substantially horizontal portions 58ᵃ of the tracks, whereupon they move upwardly to a slight extent over the inclined portions 58ᵇ, which upward movement again automatically arrests the motion of the body as it reaches its normal horizontal position wherein the plate 79 is again engaged by the latch members 77.

The foregoing discussion of the movement of the body 35 to and from a dumping position has not taken account of the automatic feature of the dumping movement brought about by the inclination of the tracks 58 and 59. By properly designing these tracks and locating the supporting rollers in appropriate positions with respect to the center of gravity of the body, when loaded or unloaded, the movement of the body may be caused to take place automatically from a normal horizontal position to dumping position or from dumping position to a normal horizontal position, or both of these movements may be caused to be automatic. Handles 85 are, however, provided on the sides 35ᵇ of the body adjacent the forward end thereof so that the operator may initiate or assist in the movement of the body in either direction by engaging these handles. Referring to Figs. 1 and 10, and assuming that the vertical line 86 is in a transverse plane containing the center line of the body and that the rollers 53 and 56 and their supporting tracks are so positioned that the body 35 would be in a position of equilibrium if the center of gravity were located in a transverse plane containing this line, it will be seen that if the center of gravity is located rearwardly of this plane the body will automatically move rearwardly without assistance when the latch members 77 are released from the plate 79, and, if the center of gravity of the body be located forwardly of a plane containing the line 86, the body will tend to move forwardly without assistance from its rear dumping position. Referring particularly to Fig. 10, where the normal horizontal position of the body is illustrated by full lines, it will be seen that if the rear door and associated parts of the body cause the rear end of the body to be of substantially the same weight, or slightly heavier than that of the forward end of the body, the center of gravity will be located on or slightly rearwardly of the vertical center line 86, as shown by the point 87, so that the body will tend to move automatically toward its inclined dumping position when the latch members 77 are released. If the center of gravity of the body when loaded is normally in a plane containing the line 86, a slight initial push may be imparted to the body to start the dumping movement. In either case, the body moves automatically to its dumping position with the center of gravity travelling along the line 88 until it finally reaches a point 89 as the body arrives at its extreme dumping position, shown by full lines in Fig. 10. As the body approaches its inclined dumping position, the latches 42 are operated to release the rear dumping gate so that the contents of the body are permitted to slide outwardly and downwardly with the result that the center of gravity is then lowered so that it occupies a position shown by the point 90 in Fig. 10. With this arrangement, the return movement of the body toward the normal horizontal position illustrated by dotted lines in Fig. 10, causes the center of gravity to travel along the line 91 until it arrives at the point 92, located in a plane containing the line 86, when the body arrives again at its normal horizontal position. If the point 90 is higher than the point 92, the body may return automatically to its normal horizontal position, but although the downward curvature of the first portion of this path of travel may cause an initial return movement, it may be necessary to give assistance to the return movement of the body if the rear end portion of the body is heavier than the forward end thereof. If the parts are so proportioned that the center of gravity of the body when loaded occupies a position in a plane containing the line 86, the body is in a position of substantial equilibrium and by giving the loaded body an initial push, it then moves automatically to the dumping position and then, when the contents of the body have been dumped, the body would tend to return automatically to its normal horizontal position which would return the center of gravity to the point 92 in a plane containing the line 86.

It will be apparent that the automatic movements of the body when loaded and unloaded may be regulated to suit the purpose for which the truck is designed by suitably proportioning the relative inclination of the tracks and by properly arranging the weight of the body with respect to its support. If it be assumed that a counterweight 93 be applied to the forward end of the body as shown by full lines at 93 on the full line construction of Fig. 10, which represents the normal horizontal position, it will be seen that this added weight will cause the center of gravity of the body when loaded to occupy the position 94 which is located forwardly of a plane containing the line 86, thus tending to hold the body in its horizontal position. If the latch members 77 are then released, an initial push must be imparted to the body to start it on its dumping movement and, when once started, it will move automatically with the center of gravity traveling along the full line 95 until it terminates at a point 96. The contents of the body are then dumped due to the inclination of the body and the opening of the rear gate or door, and the presence of the counterweight at the forward end of the body causes the center of gravity to move to the point 97 which is relatively high as compared with the position it occupied when the counterweight 93 was not employed. This high position of the center of gravity then causes the body to return automatically to its normal horizontal position with the center of gravity traveling along the line 98 until it reaches a final forward position 99 which is considerably ahead of a plane containing the line 86.

Whether or not the counterweight 93 be employed, it will be apparent that the body springs 24 are adapted to assist the return movement of the empty body toward its normal horizontal position due to the fact that these springs, when the body is loaded, are depressed, with a corresponding lowering of the center of gravity and then, when the contents of the body are dumped, the reduced weight of these springs permits them to elevate the rear end of the frame and the body, thereby assisting in raising the center of gravity of the unloaded body to a more elevated position when it is in its inclined dumping position. In this way, the action of the body springs 24 may be utilized for facilitating the return of the body to its normal horizontal position.

Due to the irregular curvature and relative inclination of the tracks 58 and 59 along which the rollers move during the travel of the body from its normal horizontal position to its dumping position, the center of gravity of the body moves outwardly or rearwardly in a very nearly horizontal direction, whether or not the counterweight 93 be employed, as shown by the lines 88 and 95 of Fig. 10, which represent the paths of travel of the center of gravity during the dumping movement and at the end of the dumping movement, there is a slight upward movement of the center of gravity due to the upturned portions 59b at the rear ends of the tracks 59. This upward movement is enhanced when the contents of the body have been dumped because of the elevation effected by the truck springs 24. The body thus has an outward throw with an upward movement at the end of its travel, similar to the motion of a shovel in the hands of a workman when moving sand, gravel or other loose materials. This upward throw at the end of the dumping movement greatly facilitates the discharge of the contents of the body. Notwithstanding the substantially horizontal travel or slight downward movement of the center of gravity of the body when it moves toward its dumping position, the rear end of the body has a sharp downward movement as shown by the dotted line 100 in Fig. 10. At the beginning of this movement, the rear edge of the lower floor or lower wall of the body moves slightly rearwardly as shown at 100a and it then moves sharply in a downward direction, terminating at the lower end of its travel in an outward throw as shown by the lower out-turned portion 100ᵇ of the line 100. An efficient dumping movement of the body is thus obtained without materially lowering its center of gravity during the dumping movement and without creating a condition which requires a substantial effort to return the body to its normal horizontal position. If desired, a body may be mounted on a frame by a supporting track and roller structure embodying the principles herein described but having the movement of the center of gravity so arranged that power derived from the truck engine, or some other source, may be required for moving the body in one or both directions.

Although one principal form and a modification of the invention have been shown and described by way of illustration, it will be understood that it may be constructed in various other embodiments within the scope of the appended claims.

I claim:

1. The combination with a vehicle frame, of an auxiliary frame mounted thereon and provided with upwardly converging tracks, and a body positioned above said auxiliary frame and having supporting rollers arranged to travel on said tracks, said tracks having curved lower extremities to cause an upward movement of the body adjacent each limit of its travel on said tracks.

2. The combination with a vehicle frame, of an auxiliary frame mounted thereon, upwardly converging tracks mounted on said auxiliary frame to extend longitudinally of the vehicle, a body, and supporting means for said body including rollers arranged to travel continuously on said tracks during movement of said body to and from an inclined dumping position, said tracks having parts inclined adjacent the limit of the dumping movement to effect an outward throw of the body as it reaches its dumping position.

3. The combination with a vehicle frame, of an auxiliary frame mounted thereon, upwardly converging tracks carried by said auxiliary frame, a body having rollers arranged to travel continuously on said tracks in moving to and from dumping position, and additional means carried by said auxiliary frame to provide a support for said body when it is in its normal position.

4. The combination with a vehicle frame, of track members extending longitudinally thereof and converging upwardly, a body having rollers arranged to travel continuously on said tracks to permit movement of said body automatically from a normal horizontal position rearwardly to an inclined dumping position, and supporting means carried by said frame for supporting the forward portion of said body when in its horizontal position.

5. The combination with a vehicle frame, of tracks mounted on said frame to converge upwardly in a plane extending longitudinally of said frame, a body having a forward roller to travel on one of said tracks and a rear roller to travel on the other of said tracks, and a support carried by said frame for supporting the forward portion of said body, said last named track being curved upwardly at its lower end to cause an outward and upward throw of the body as it reaches its dumping position.

6. The combination with a vehicle frame, of tracks mounted on said frame to converge upwardly in a plane extending longitudinally of said frame, a body having a forward roller to travel on one of said tracks and a rear roller to travel on the other of said tracks, and a support carried by said frame for supporting the forward portion of said body, the lower end of the forward one of said tracks being reversely inclined to the body portion thereof.

7. The combination with a vehicle frame, of an auxiliary frame, a pair of longitudinally extending guide members carried by said auxiliary frame, each of said guide members comprising a pair of tracks converging upwardly, a body, two pairs of rollers carried by said body, each pair of rollers being arranged to coact with the upwardly converging tracks of one guide member, and supporting means engaging the forward portion of said body whereby the body in its normal horizontal position is supported by said supporting means and by the rear rollers of said pairs of rollers.

8. The combination with a vehicle frame, of tracks mounted on said frame and comprising parts converging upwardly, a body, and supporting means carried by said body and comprising rollers arranged to travel on said tracks to permit the movement of said body from normal horizontal position to an inclined dumping position and return, said tracks and said rollers being so arranged with respect to the center of gravity of the body that the body moves automatically to inclined dumping position when loaded and returns automatically to normal horizontal position when unloaded, and means for securing the body in its normal horizontal position.

9. The combination with a vehicle frame, of a body disposed above said frame, guide members extending longitudinally of said frame and comprising upwardly converging tracks, rollers carried by said frame and arranged to travel continuously on said tracks during the movement of said body from its normal horizontal position to and from an inclined dumping position, said tracks and rollers being arranged with respect to the center of gravity of the body to cause an automatic movement of the body to dumping position when loaded, the lower rear portions of said tracks being inclined upwardly to cause an upward and outward throw of said body as it reaches its dumping position.

10. The combination with a vehicle frame, of a body disposed above said frame, guide members extending longitudinally of said frame and comprising upwardly converging tracks, rollers carried by said frame and arranged to travel continuously on said tracks during the movement of said body from its normal horizontal position to and from an inclined dumping position, said tracks and rollers being arranged with respect to the center of gravity of the body to cause an automatic movement of the body to dumping position when loaded, the lower rear portions of said tracks being inclined upwardly to cause an upward and outward throw of said body as it reaches its dumping position, and means engaging the forward portion of said body for supporting and detachably securing it in its normal horizontal position.

11. The combination with a vehicle frame having rear supporting springs, of a body disposed above said frame, guide members extending longitudinally of said frame and having upwardly converging tracks, rollers carried by said frame and arranged to travel continuously on said tracks to permit movement of said body longitudinally of said frame to and from an inclined dumping position, said tracks and said rollers being arranged with respect to the center of gravity of the body to cause the body to move automatically to said dumping position when it is loaded and said springs are depressed, said tracks and rollers being arranged to return said body automatically to its normal horizontal position when said load has been discharged and said springs have elevated the rear end of said frame, and means for securing the body in its normal horizontal position.

12. The combination with a vehicle frame, of guide members extending longitudinally of said frame and comprising upwardly converging tracks having upper guide flanges extending parallel to said tracks, a body disposed above said frame, rollers carried by said body and maintained in said engagement with said tracks by said guide flanges, the lower ends of said tracks and flanges being directed upwardly, and supporting means carried by said frame for engaging the forward portion of said body.

13. The combination with a vehicle frame, of guide members carried by said frame and extending longitudinally thereof, a body disposed above said frame, rollers carried by said body to travel on said guide members, a supporting block carried by said frame beneath the forward portion of said body and having an upwardly and forwardly inclined surface, and a standard carried by said body and having a lower part adapted to ride upwardly and forwardly on said inclined surface as said body reaches its normal horizontal position during the movement of said rollers on said guide members.

14. The combination with a vehicle frame, of guide members carried by said frame and extending longitudinally thereof, a body disposed above said frame, rollers carried by said body to travel on said guide members, a supporting block carried by said frame beneath the forward portion of said body and having an upwardly and forwardly inclined surface, a standard carried by said body and having a lower part adapted to ride upwardly and forwardly on said inclined surface as said body reaches its normal horizontal position during the movement of said rollers on said guide members, and latching means for automatically securing said body in its forward position at the end of its forward movement.

15. The combination with a vehicle frame, of guide members carried by said frame and extending longitudinally thereof, a body disposed above said frame, rollers carried by said body to travel on said guide members, a supporting block carried by said frame beneath the forward portion of said body and having an upwardly and forwardly inclined surface, a standard carried by said body and having a lower part adapted to ride upwardly and forwardly on said inclined surface as said body reaches its normal horizontal position during the movement of said rollers on said guide members, and latching means carried by said block and engaging a part carried by said standard for securing said body in its normal horizontal position.

16. The combination with a vehicle frame, of a body positioned above said frame, rollers carried by said body, and relatively inclined tracks carried by said frame and coacting with said rollers to effect the movement of said body from normal horizontal position to an inclined dumping position without substantially lowering the center of gravity of the body when loaded, said tracks being curved with a lesser degree of curvature than the peripheries of said rollers to impart an outward throw to the body at the limit of its dumping movement.

17. The combination with a vehicle frame, of a body positioned above said frame, rollers carried by said body, relatively inclined tracks carried by said frame and coacting with said rollers to effect the movement of said body from normal horizontal position to an inclined dumping position without substantially lowering the center of gravity of the body when loaded, said tracks being curved with a lesser degree of curvature than the peripheries of said rollers to impart an outward throw to the body at the limit of its dumping movement, and truck springs connected with said vehicle frame for assisting in the elevation of the center of gravity of the body when the contents thereof are dumped.

18. In combination, a body, side frames having rollers at the front and rear thereof, diagonally disposed front and rear tracks on either side of said body for supporting said rollers, the forward portions of said front tracks being substantially horizontal for releasing purposes, and the forward portion of the rear track being arcuate and inclined, said tracks and said body being so arranged that when the body is empty it will return to its horizontal position and when loaded it will return to dumping position.

19. In combination, a body, side frames having rollers at the front and rear thereof, diagonally disposed front and rear tracks on either side of said body for supporting said rollers, the forward portions of said front tracks being substantially horizontal for releasing purposes, and the forward portion of the rear track being arcuate and inclined, said tracks and said body being so arranged that when the body is empty it will return to its horizontal position and when loaded it will return to dumping position, means to guide said body on its rollers horizontally before tilting to dumping position.

20. In combination, a body, side frames carried thereby having rollers at the front and rear thereof, diagonally disposed front and rear tracks at either side of said body for supporting said rollers, said tracks and said body being so arranged that when the body is empty it will return to its horizontal position and when loaded it will return to dump position, means to guide said body on its rollers substantially horizontally before tilting to dumping position, and hook means adapted to be disengaged by said horizontal movement of the body and for retaining said body in its horizontal position when the rollers are in their forwardmost position in said tracks.

THOGER GRONBORG JUNGERSEN.